Figure 1:
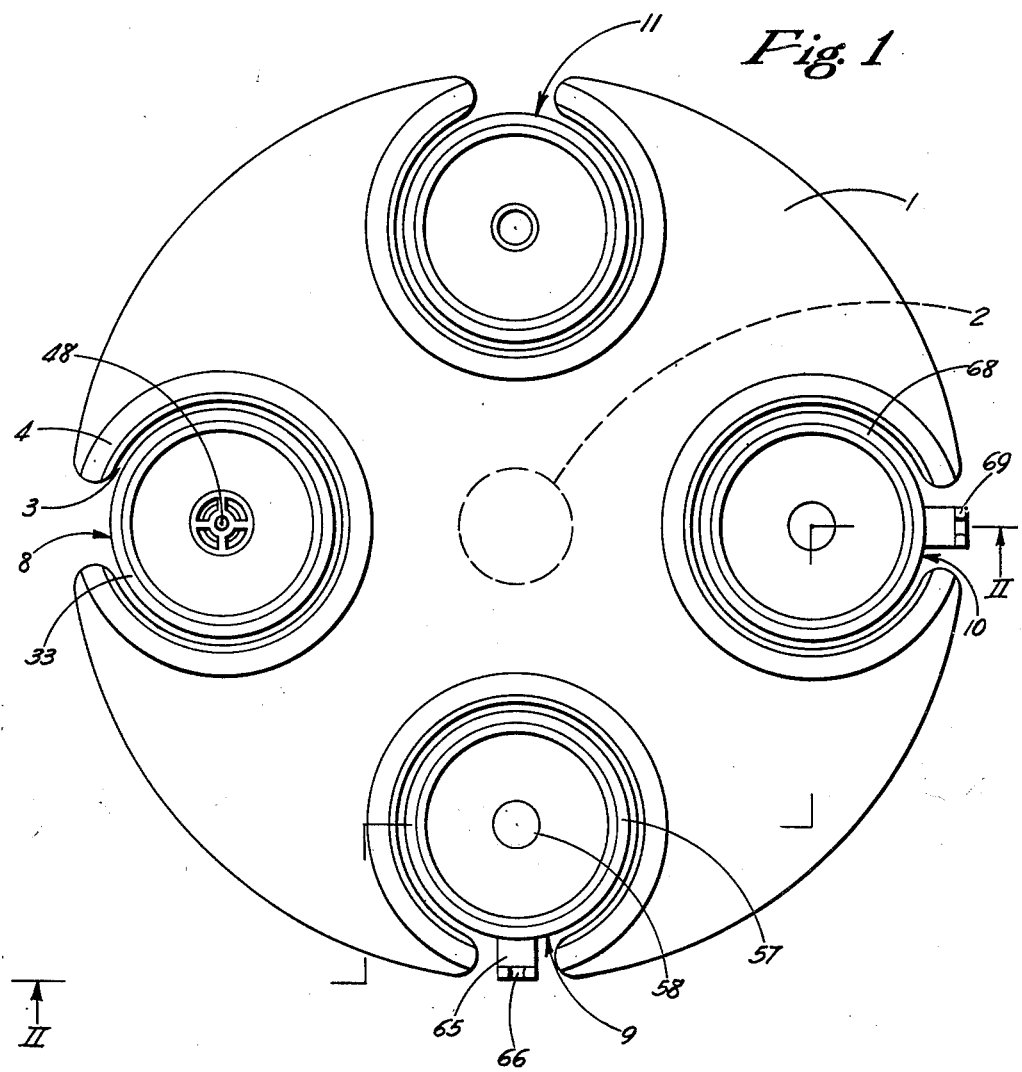

Oct. 14, 1952 — W. H. EMERSON — 2,613,594
MULTICOLOR STAMPING OF DINNERWARE
Filed Oct. 1, 1947 — 7 Sheets-Sheet 1

INVENTOR.
WALTER H. EMERSON, DECEASED,
ELIZABETH K. EMERSON, EXECUTRIX
BY
Brown, Critchlow, Flick + Peckham
attorneys.

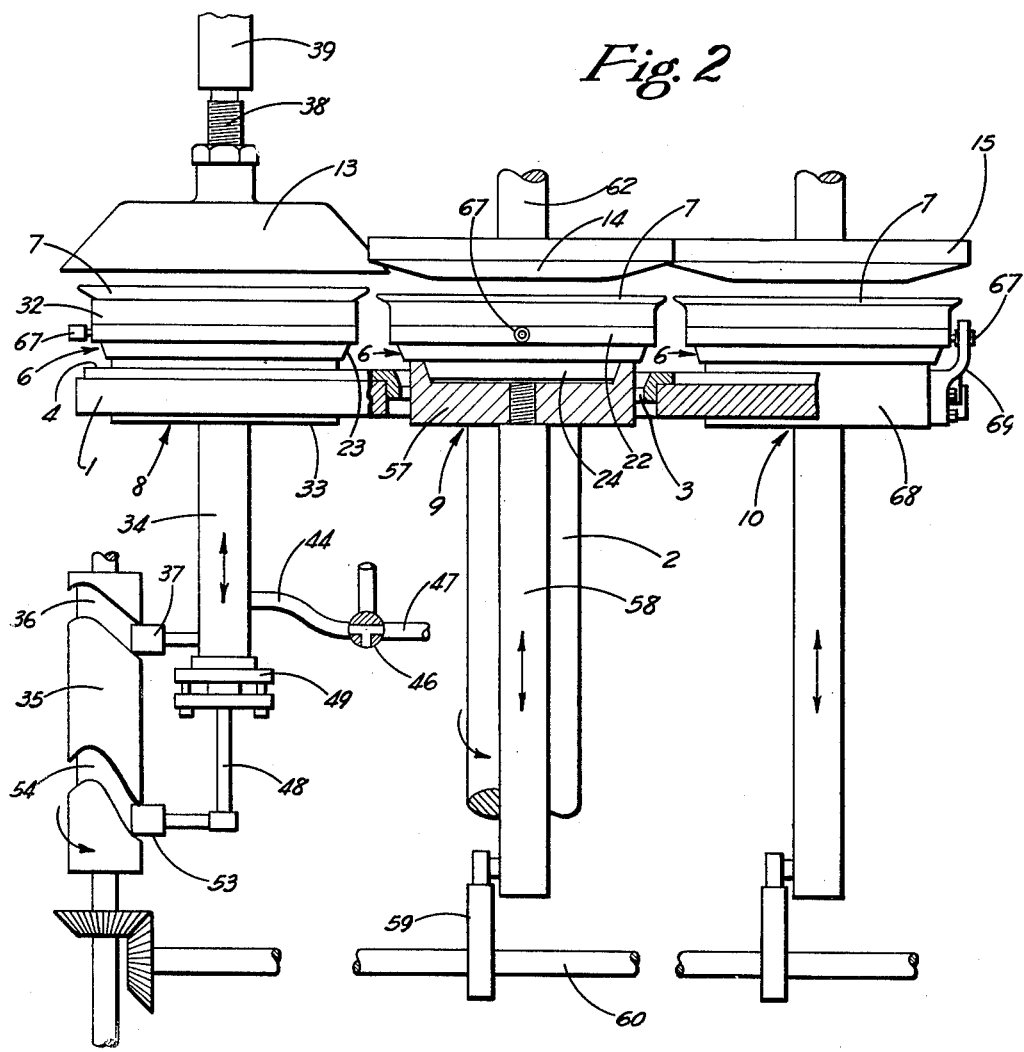
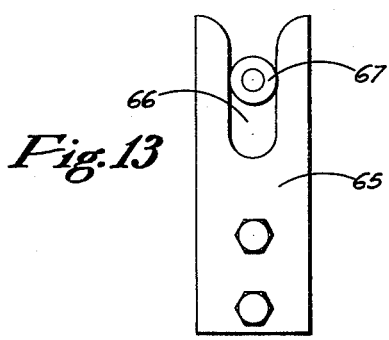

Oct. 14, 1952 W. H. EMERSON 2,613,594
MULTICOLOR STAMPING OF DINNERWARE
Filed Oct. 1, 1947 7 Sheets—Sheet 3

INVENTOR.
WALTER H. EMERSON, DECEASED,
ELIZABETH K. EMERSON, EXECUTRIX
BY
Brown, Critchlow, Flick & Peckham
Attorneys Oct. 14, 1952 W. H. EMERSON 2,613,594
MULTICOLOR STAMPING OF DINNERWARE
Filed Oct. 1, 1947 7 Sheets-Sheet 4
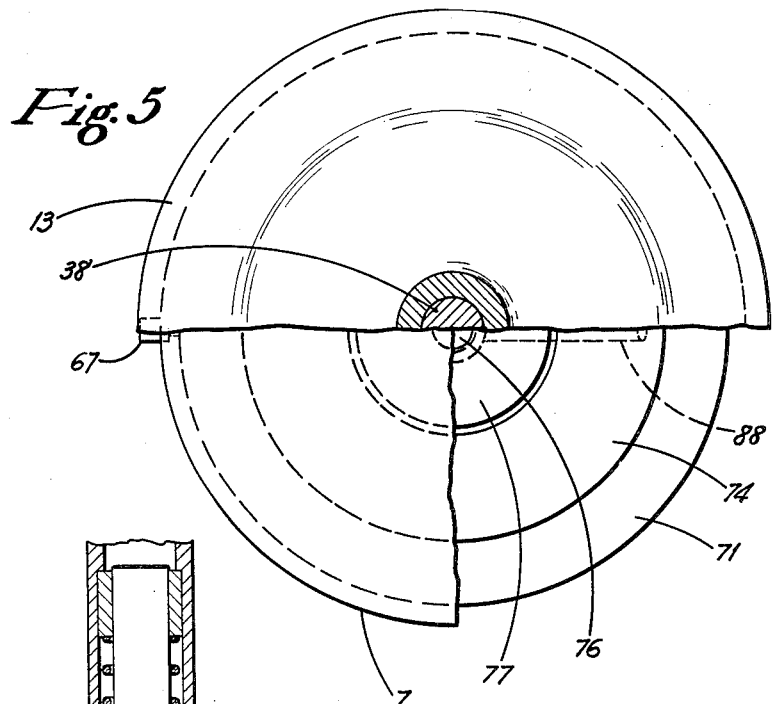
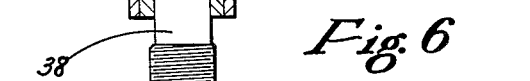
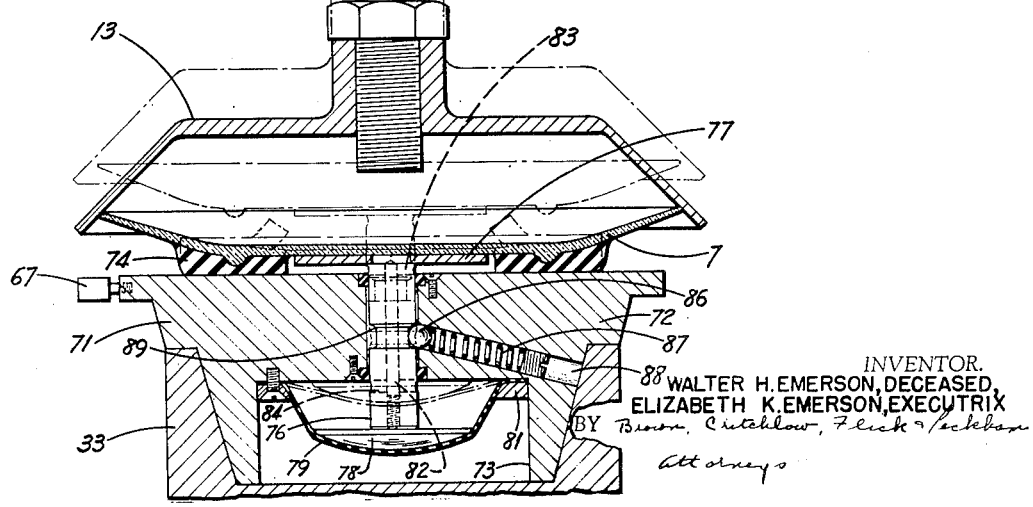
INVENTOR.
WALTER H. EMERSON, DECEASED,
ELIZABETH K. EMERSON, EXECUTRIX
BY Brown, Critchlow, Flick & Peckham
Attorneys Oct. 14, 1952 W. H. EMERSON 2,613,594
MULTICOLOR STAMPING OF DINNERWARE
Filed Oct. 1, 1947 7 Sheets-Sheet 5

INVENTOR.
WALTER H. EMERSON, DECEASED.
ELIZABETH K. EMERSON, EXECUTRIX
BY Brown, Critchlow, Flick & Peckham
Attorneys Oct. 14, 1952           W. H. EMERSON           2,613,594
MULTICOLOR STAMPING OF DINNERWARE
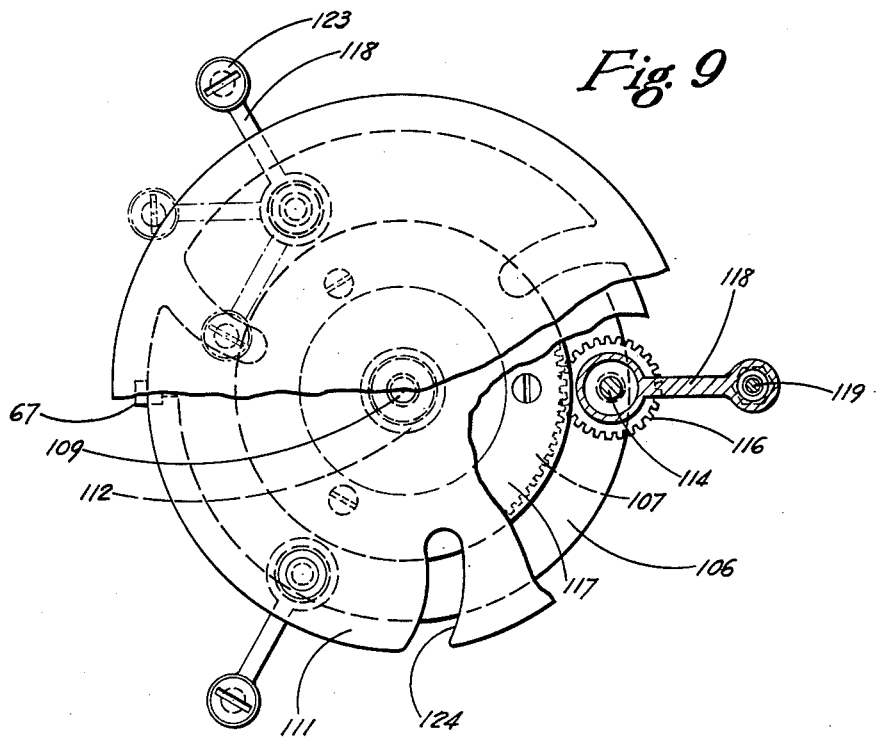
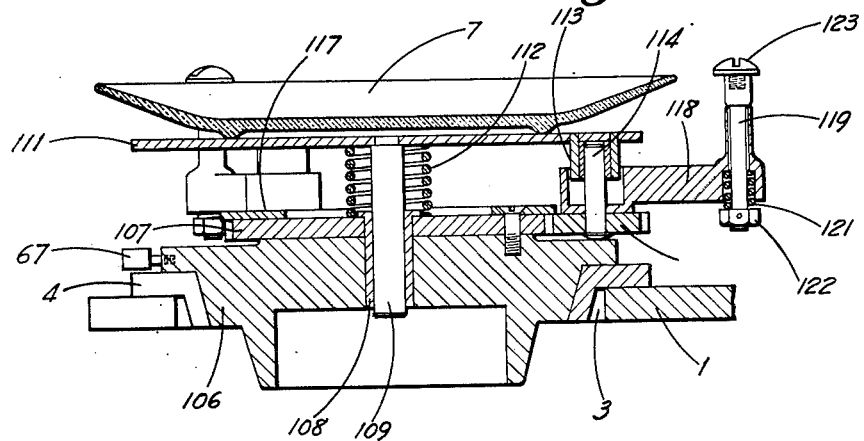

Oct. 14, 1952     W. H. EMERSON     2,613,594
MULTICOLOR STAMPING OF DINNERWARE
Filed Oct. 1, 1947     7 Sheets-Sheet 7

INVENTOR.
WALTER H. EMERSON, DECEASED,
ELIZABETH K. EMERSON, EXECUTRIX
BY
attorneys Patented Oct. 14, 1952

2,613,594

UNITED STATES PATENT OFFICE 2,613,594

MULTICOLOR STAMPING OF DINNERWARE

Walter H. Emerson, deceased, late of East Liverpool, Ohio, by Elizabeth King Emerson, executrix, East Liverpool, Ohio, assignor to The Homer Laughlin China Company, Newell, W. Va., a corporation of Delaware Application October 1, 1947, Serial No. 777,222

10 Claims. (Cl. 101—44)

This invention relates to dinnerware decorating apparatus, and more particularly to apparatus for use in the printing of decoration in a plurality of colors on an article of ware.

It is among the objects of this invention to provide apparatus which makes it possible to print multi-color decoration on an article of ware with the different colors registering with one another, which permits each color to be printed by a separate printing device, which allows any desired number of colors to be used, and which decorates ware rapidly enough to be commercially practicable. A more specific object is to provide an independent chuck for carrying an article of ware, fastened thereon in predetermined position, through successive decorating stations.

In accordance with this invention an article of ware is placed on an individual ware carrier which supports means for holding the ware in predetermined position. The ware preferably first is centered on this chuck, such as by means forming a part of the chuck or by separate centering means, and then the ware is held in that position mechanically or by suction while the ware is being decorated by different printing devices to which the chuck is moved in succession. While each successive color is being applied to the ware the supporting chuck is held in such a position that the color will register in the desired manner with the color previously applied to the ware. After the decorating has been completed the decorated ware is removed from the chuck and an undecorated piece affixed to it. Most suitably, the chuck is carried from one station to another by an automatic conveyer, and at each station the chuck is lifted from the conveyer to press the ware carried by the chuck against a decorating stamp above it, or to hold the ware adjacent some other type of color printing device. In such a case the chuck and the lifting means are so formed as to hold the chuck in proper position at each station, so that colors printed on the ware at the successive stations will register exactly with one another.

The invention is illustrated in the accompanying drawings in which Fig. 1 is a plan view of part of a simple machine for decorating ware; Fig. 2 is a fragmentary vertical section through the machine taken on line II—II of Fig. 1 and showing the chucks being lifted from the table; Figs. 3, 5, 7, 9, and 11 are enlarged plan views of five different chucks with ware thereon partly broken away (the chuck in Fig. 3 utilizing an external vacuum pump to hold the ware on it, the chuck in Fig. 5 containing its own vacuum producing device, the chuck in Fig. 7 using pressure sensitive adhesive for holding the ware thereon, the chuck in Fig. 9 requiring the ware to be rotated to engage retaining members with the ware, and the chuck in Fig. 11 mechanically gripping the ware when the ware is pressed down onto it); Figs. 4, 6, 8, 10, and 12 are vertical sections through the different chucks shown in Figs. 3, 5, 7, 9, and 11, respectively; and Fig. 13 is an enlarged front view of the chuck-positioning bracket and roller.

For the purpose of simplifying the drawings and description, this invention is shown embodied in a simple rotary machine of the indexing type. This machine fully illustrates the principles of the invention. In actual practice when it is desirable to print many colors on an article of ware, a rotary machine would have to be made so large as to become impracticable. Therefore, a straight line machine is preferred because it permits decoration with an infinite number of colors, and it is in such a machine that this invention has its greatest value. Only the major elements of the rotary machine shown herein are illustrated. Among other things, the bearings for the rotating and the sliding shafts and posts are omitted.

Referring to Figs. 1 and 2 of the drawings, a table 1 is rigidly mounted on the upper end of a rotatable shaft 2. The table is provided with a plurality of inwardly extending recesses 3 spaced an equal number of degrees apart, four recesses being shown for the purpose of illustration only. In practice, the number of recesses depends on the number of colors that the ware is to receive. Each recess has an inner circular portion surrounded by an incomplete ring 4 which forms a tapered seat for the chucks 6 to be described later. The particular table shown is turned 90° periodically by any suitable indexing mechanism, such as a Geneva drive (not shown) operatively connected to the table shaft in well-known manner. It follows that there are four stations around the table. At one of these stations ware, such as an article 7 of dinnerware, is affixed to one of the chucks carried loosely in the table recesses. At the next two stations decorations are printed on the ware. The remaining station may be an unloading station, or both an unloading and loading station. At the different stations vertically reciprocable lifting devices 8, 9, 10, and 11 are mounted below the table recesses. The tops of these devices normally are located below the table, but during each pause in the rotation of the table they move up through the table recesses above them to lift the chucks from the table. At the ware-affixing station a ware-centering member 13 is mounted directly above the lifting device 8. At the decorating stations decoration printers, such as stamps 14 and 15, are mounted above the underlying lifting devices 9 and 10, respectively, in axial alignment with them.

Figure 4:
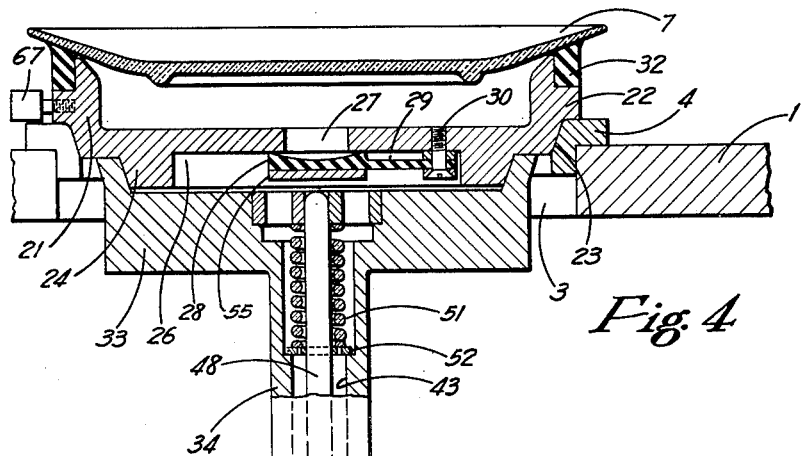
Figure 3:
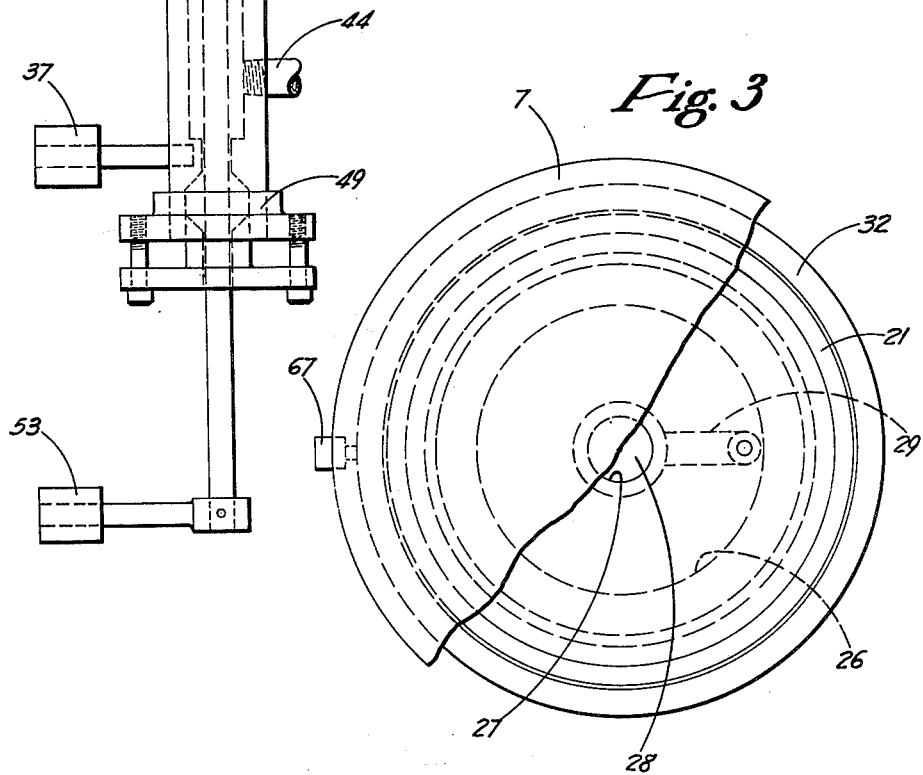
Figure 7:
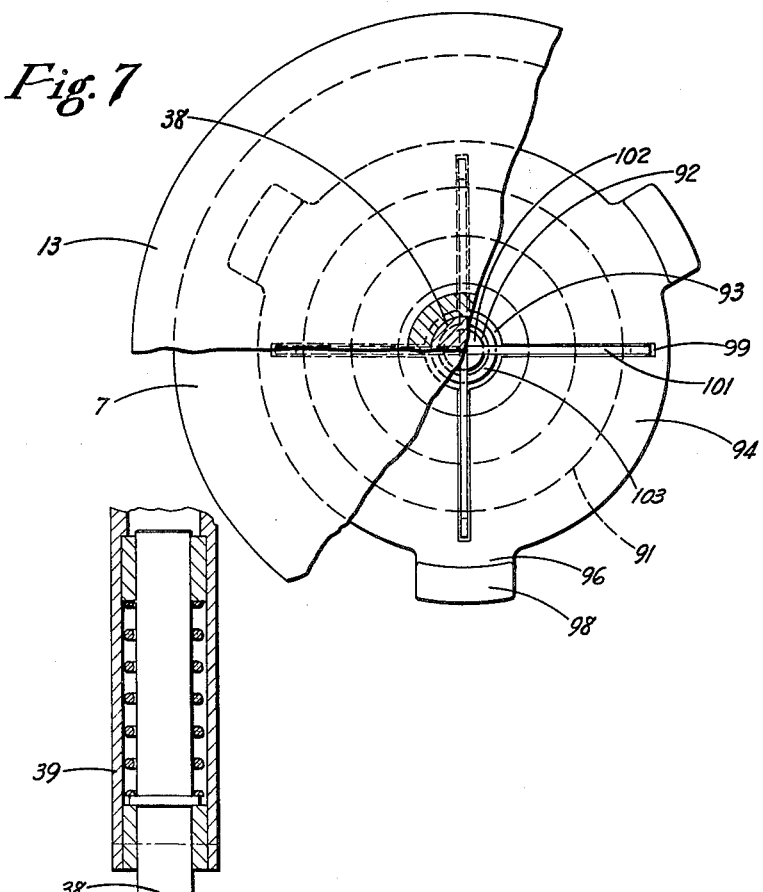
Figure 8:
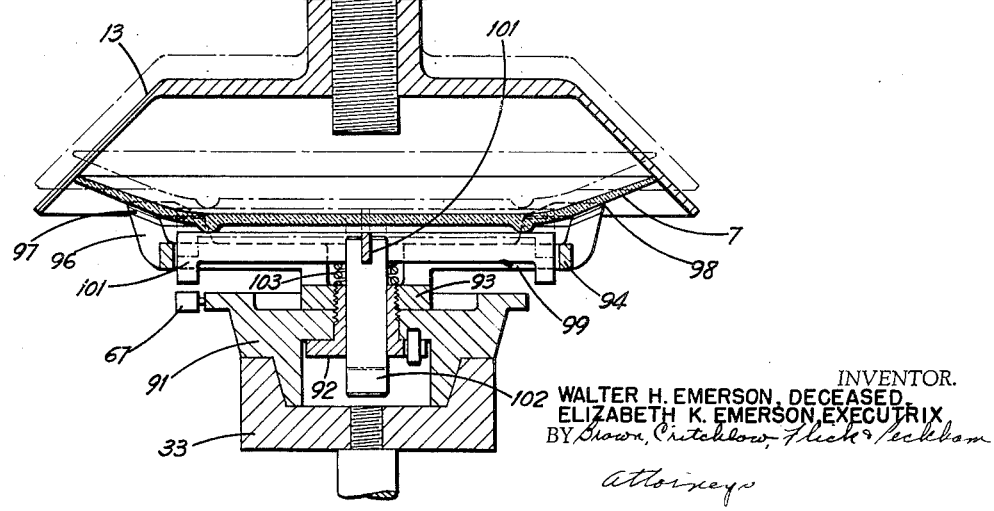

It is a feature of this invention that each article of ware to be decorated is attached rigidly to a separate independent chuck 6 and then is carried by that chuck through the different steps of the decorating cycle. One form of chuck that may be used is shown in Figs. 2 to 4. This chuck has a circular cup-shape base 21 encircled by a shoulder 22 from which a seating surface 23 tapers downwardly. The shoulder and tapered surface form a seat which will cooperate with any of the seating rings 4 on the table. The bottom of the chuck has a downwardly tapered portion 24 of reduced diameter provided with a recess 26. This bottom portion is adapted to seat snugly in the top of any one of the lifting devices. The bottom wall of the chuck is provided with a central opening 27 controlled by a suitable check valve, preferably by a flap valve 28 of rubber or the like located below the opening and provided with a lateral projection 29 attached at its outer end to the base by a screw 30. Normally there is a little space between this valve and the base. The upper portion of the chuck base is encircled by a ring 32 of impervious resilient material, such as rubber, the upper surface of which is inclined downwardly toward the center of the chuck. This ring is for the purpose of supporting an article of dinnerware 7, with the rim of which it forms a seal. It will be seen that if the air pressure within the chuck is reduced, the ware will compress the rubber ring and be held firmly in place on it.

For the purpose of affixing ware in proper position to a chuck, lifting device 8 includes a lifting head 33 mounted on the upper end of a hollow post 34. The top of the head is provided with a tapered socket for receiving the tapered lower end 24 of a chuck. One way of reciprocating the head is by means of a continuously rotating drum 35 encircled by a cam groove 36 in which is disposed a roller 37 connected to the side of the post. Every time the cam lifts the post, the head is elevated through the table recess above it to pick up the chuck resting in that recess in order to raise it above the table. As the chuck is moved upwardly, the ware supported by it enters the downwardly flared centering ring 13 which is disposed in axial alignment with the lifting head. The ring adjusts the ware laterally on supporting ring 32 to center it on the chuck. The centering ring is adjustably mounted on the lower end of a rod 38 which is slidably supported in a vertical tube 39 held above the chuck in any suitable manner. As shown in detail in Fig. 6, rod 38 is provided with a collar 41 that prevents it from dropping out out the tube, but, if a piece of ware happens to be oversize, it can push the centering ring upwardly toward the tube. A coil spring 42 encircles the rod in the tube to resist upward movement of the ring.

As soon as the ware is centered on the chuck, air is withdrawn from inside the chuck so that the ware will be secured thereto in centered position. This may be accomplished by extending the axial passage 43 (Fig. 4) in hollow post 34 up through the head 33, and by connecting the side of the passage to a flexible hose 44 that leads to a three-way main valve 46 connected by a pipe 47 to any suitable vacuum producing system (not shown). When main valve 46 is in one position it connects pipe 47 with the hose, but when moved to its other position it closes the pipe and connects the hose with the atmosphere. The valve may be operated manually or automatically in any well-known manner. As soon as the ware has been centered on the chuck, this valve is operated to connect pipe 47 with hose 44 in order to reduce the air pressure in the chuck. The flap valve on the bottom of the chuck then is closed, following which the main valve is operated to connect post passage 43 with the atmosphere so that the chuck can be removed from the lifting head.

For automatically closing the flap valve, a rod 48 extends slidably through a packing gland 49 at the lower end of the post and up through the post and head. The rod is pressed downwardly by a coil spring 51 which encircles its upper end and bears against a perforated collar 52 secured to the rod and engaging a shoulder in the post. The lower end of the rod carries a roller 53 which rides in a cam groove 54 in drum 35. This cam is formed for raising the rod in the post after the post has reached the top of its stroke, so that the upper end of the rod will press the flap valve up against the bottom of the chuck and hold it there while the main valve is manipulated to admit atmospheric pressure to the lifting head. Atmospheric pressure then will hold the flap valve closed while the rod descends in the post. The post and rod move down together to set the chuck back in the table ring 4 from which it was raised. In Fig. 4 the chuck is shown at the moment the lifting head 33 has set it in ring 4, before the lifting head has moved down away from the chuck so that the table can be turned to carry the chuck to the next station. Attached to the bottom of the flap valve is a metal disc 55 with which the rod makes contact, and which adds weight to the valve to assure its hanging away from the chuck opening when the air pressure inside the chuck it atmospheric.

Following this, the table is indexed to transport the chuck and ware to the first decorating station where the chuck again is lifted from the table, this time by the lifting device 9 which includes a head 57 mounted on the upper end of a post 58. The post is reciprocated vertically in any suitable manner, such as by a rotating cam 59 on a continuously rotating shaft 60, and the head is provided with a tapered socket for snugly receiving the tapered bottom of the chuck. When the post is raised, the head lifts the chuck and presses the ware carried by it against decorating stamp 14. The stamp is mounted on the lower end of a rod 62 which is supported above the table in any suitable manner. The roller which periodically applies color to the stamp is not shown, so as not to complicate the drawings unnecessarily, but such rollers and their operation are well known.

Another important feature of this invention is that the chuck is held in a preselected position on the lifting head when the ware is pressed against the stamp, so that the colors applied to the ware at successive stations will register with one another. Special provision is made for this because of the difficulty of controlling the movements of the table or conveyor accurately enough to insure registration of colors, because the chucks may rotate slightly in their seats while traveling from one station to another, and because they may be rotated slightly when they are picked up by the lifting devices or reseated on the table.

There are various ways in which the position of the chuck on the lifting head can be controlled, one of them being as follows. As shown in Figs. 1, 2 and 13, a bifurcated bracket 65 is mounted on the side of lifting head 57 and has the opposite sides of its vertical slot 66 curved transversely so that they will make only line contact with a small roller 67 between them projecting radially from the side of the chuck base. The roller is of such a diameter compared to the width of the lower portion of the slot that it will just touch both sides of the slot when the bracket is moved upwardly to straddle the roller. In the beginning the chucks are placed on the table in such a position that the wide upper end of slot 66 will be sure to receive the roller 67 on each successive chuck as the bracket rises, so that the bracket will rotate the chuck in either direction in table seat 4 whatever amount is necessary to cause the roller to engage both sides of the lower portion of the slot. At the next decorating station the lifting head 68 is provided with a similar bifurcated bracket 69 which will have to be below roller 67 on the chuck when the latter is indexed into position above head 68. Therefore, when the head moves upwardly toward the table the bracket will straddle the roller and, if the chuck is not in correct position, will turn the chuck in seat 4 as the roller enters the lower part of the slot.

The position of the first positioning bracket 65 relative to stamp 14 is immaterial, but the position of the second bracket 69 is important because it must be able to receive roller 67 after the chuck has been indexed to the second decorating station. The position of the second stamp 15, and of any following stamps, relative to the underlying chuck-positioning bracket also is very important, because of the second color applied to the ware must register with the first color. Therefore, when the machine is set up, stamp 15 is turned on its axis and shifted laterally to the position in which the decoration printed by it on the ware will register with the decoration printed by the first stamp. Then stamp 15 is locked in that position. Registration then will be assured, because the position of the first decoration is controlled by the positioning bracket 65.

After decoration of the ware has been completed, the table indexes the chuck to the fourth station where the chuck is lifted from the table by lifting device 11. This device may be constructed the same as lifting device 8, except that it does not include the rod by which the flap valve is closed. When the chuck is lifted from the table, suction is applied to it through the lifting device so that the flap valve will be pulled away from the bottom of the chuck. Due to the weight of the valve, it will remain open when the bottom of the chuck is connected with the atmosphere, whereupon atmospheric pressure will be restored to the inside of the chuck so that the decorated ware can be removed from it. An undecorated article of ware then is placed on the chuck immediately, or as soon as the chuck has been indexed to the affixing station, and the cycle just described then is repeated. Of course it will be understood that there are chucks 6 in all of the table recesses at the same time, and that all of the lifting devices rise together. Therefore, when a piece of ware is being centered on the chuck at the first station, two other pieces are being pressed against the decorating stamps at the same time, and a fourth piece is being released from the chuck at the unloading station.

If desired, the apparatus for reducing the air pressure in the chuck may be incorporated in the chuck itself. In such a case the lifting device at the ware-affixing station can be made substantially the same as the ones at the decorating stations, and the lifting device at the unloading station can be omitted. Self-contained suction producing apparatus is shown in Figs. 5 and 6. The chuck base 71 has a flat top, an upper tapered seat 72 for engaging a seating ring 4, and a lower tapered portion adapted to seat in a lifting head. This lower portion is provided with an upwardly extending circular recess 73, and the base is provided with an axial opening through it. Mounted on top of the base is an impervious resilient ring 74 which is molded in such a way that the outer portion of the ring will rest flat on the base to which it is cemented while the inner portion of the ring converges upwardly away from the base as shown in broken lines. Slidably mounted in the axial opening in the base is a stem 76 on the upper end of which a plate 77 is mounted. This plate is smaller than the inside of the flexible ring. Secured to the lower end of the stem is a convex disc 78 which rests on a rubber diaphragm 79 the edge of which is clamped tightly against the top of the recess by means of a clamping ring 81. The stem is provided with an axial passage 82 that terminates at its upper end in radial passages 83 directly beneath the plate. The lower end of passage 82 is connected by radial passages 84 with the outside of the stem. The two groups of radial passages 83 and 84 are spaced apart a distance equal to the thickness of the chuck base between its upper surface and the top of recess 73, so that the area above the chuck can be placed in communication with the area enclosed by the diaphragm.

In using this chuck an article of dinnerware is set on plate 77 which at that time is held above ring 74 by diaphragm 79 engaging the disc at the bottom of stem 76. The chuck then is lifted from the table by means of the vertically reciprocated lifting head 33 to move the ware up into the centering ring 13 above it. As the ware engages the inside of the ring it is shifted laterally on plate 77 into axial alignment with the chuck. At the same time the chuck continues to rise, so the ware is pressed downwardly toward it. This is possible because stem 76 can slide down through the chuck base and stretch the diaphragm. As soon as the diaphragm starts to be stretched, the bottom of the ware engages the upturned inner edge of the flexible ring and seals the chamber above the chuck base. As the capacity of this upper chamber becomes smaller the size of the lower chamber enclosed by the diaphragm becomes larger, but the size of the latter chamber increases more rapidly than the size of the upper chamber decreases. The result is that some of the air from the upper chamber is drawn through the passages in the stem into the lower chamber, whereby the ware is held down on the flat ring by suction. The stem is detachably located in its lower position by means of a ball 86 which is pressed by a spring 87 in a bore 88 in the chuck base into an annular groove 89 in the stem. As soon as the ball has snapped into the groove the chuck is lowered with the ware attached to it. After the ware has been decorated at the successive decorating stations it can be removed from the chuck by simply lifting the ware. The resistance of spring 87 will be overcome by the weight of the chuck so that plate 77 and the stem will rise and permit normal atmospheric pressure to occur in the upper chamber.

If desired, the ware 7 may be held on the chuck by an adhesive which is engaged by the bottom of the ware after the ware has been adjusted into centered position on a depressible supporting member. For example, the chuck shown in Figs. 7 and 8 has a circular base 91 provided with a central vertical opening in which a threaded bushing 92 is mounted. Screwed on the projecting upper end of this bushing is the depressed central portion 93 of a retaining member which has a circular plate-like body 94. Although it is possible to apply the adhesive to this plate for engagement by the foot of the ware, it is preferred to provide the plate at equally spaced points around its periphery with three outwardly and upwardly extending lugs 96 the upper surfaces of which are inclined downwardly toward the center of the retaining member at about the same angle as the rim of the ware to be attached to the chuck. Mounted on the top of each lug is a thin layer of resilient material 97, such as sponge rubber, on the upper surface of which there is a layer of a suitable pressure sensitive adhesive 98.

The body of the retaining member is provided with vertical slots 99 extending through it and crossing each other at right angles at the center of the member. Movable vertically in these slots are crossed bars 101 which are rigidly mounted on the upper end of a stem 102 that is slidably disposed in the central bushing 92. The tops of the bars normally are held in a plane near the top of lugs 96 by a light coil spring 103 that encircles the stem between the bars and the top of the bushing. An article of dinnerware set on these bars can be moved sideways thereon to center position, and then be pressed downwardly against the adhesive on the lugs. This adhesive will hold the dinnerware article in its depressed position and also will keep it from being moved out of center position. For centering the ware on the bars and pressing it against the adhesive, the chuck is raised from the table by lifting head 33 to move the ware into engagement with the centering ring 13 above it. After the ware has been decorated, it is removed from the chuck by simply lifting it therefrom.

There are various ways in which the ware-centering means can be made a part of the chuck, but they generally include the use of three pins or the like which are movable simultaneously toward the axis of the chuck to center the ware first and then to hold it firmly in place. One way of accomplishing this is shown in Figs. 9 and 10 where the chuck has a base 106 on which a stationary horizontal gear 107 is mounted. The base has a laterally projecting roller 67 for properly positioning it on a lifting head. Extending through the center of the gear and base is a bushing 108 in which a stem 109 is rotatably and slidably mounted. A flat plate 111 is rigidly mounted on the upper end of the stem and is urged upwardly away from the base by means of a coil spring 112 compressed between the plate and gear. At points spaced 120° apart, the plate is provided with downwardly extending sleeves 113 in each of which the upper end of a pin 114 is slidably and rotatably mounted. The lower ends of the pins rest on the chuck base beside the gear. Pinions 116 meshing with the gear are rigidly mounted on the lower portions of the pins and are held in place by means of a retaining ring 117 overlying the gear teeth. Each sleeve telescopes into the cup-like inner end of an arm 118 secured to the underlying pinion. The arm extends radially away from the chuck base, and the outer end of the arm extends upwardly and is provided with a bore through which a headed centering pin 119 extends. The lower end of the bore is enlarged and contains a coil spring 121 that presses downwardly on a nut 122 on the lower end of the pin.

When an article of dinnerware 7 is pressed down on plate 111 and rotated, the plate carries pinions 116 around the gear by means of which they are rotated. The pinions therefore swing centering pins 119 inwardly against the edge of the ware to shift it laterally on the plate until it is centered thereon. The ware then is released, and the coil spring 112 raises it until stopped by the heads 123 of the pins overlapping the edge of the ware. The pins therefore both center and lock the ware on the chuck until the ware again is pressed down and turned in the opposite direction to swing the centering pins away from it. In case the ware is warped slightly, the springs 121 on the centering pins will allow the pins to accommodate themselves to it. For very small diameter ware, the supporting plate may be provided with inwardly extending slots 124 that will permit the centering pins to move much closer to the center of the plate, as indicated in broken lines in Fig. 9.

Figure 11:
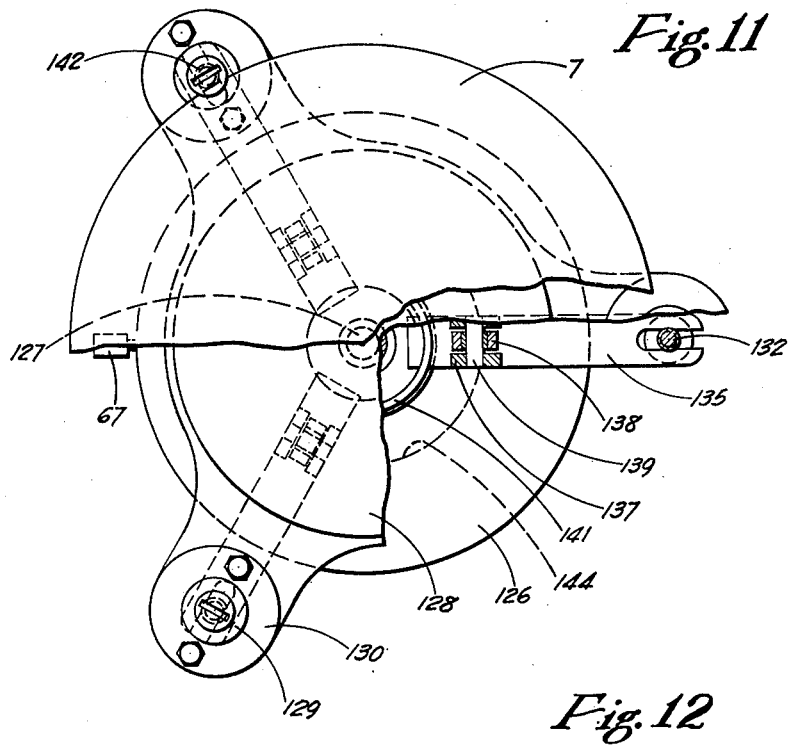
Figure 12:
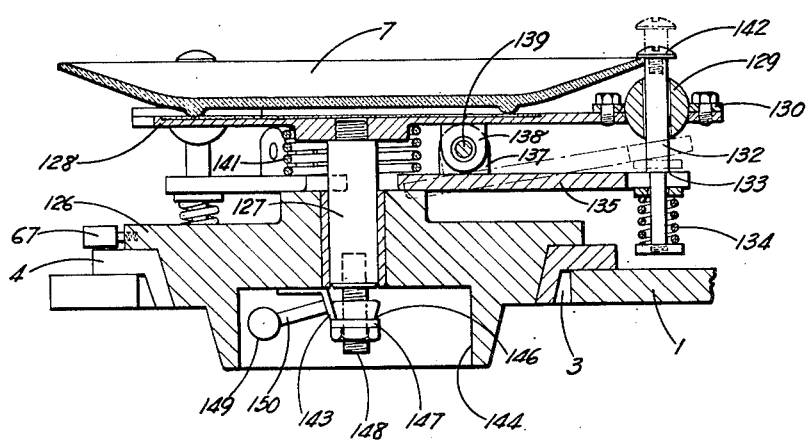

Another chuck with self-contained centering means is shown in Figs. 11 and 12. The base 126 of this chuck is provided with a positioning roller 67, and with a central opening in which a stem 127 is slidably mounted. The stem need not rotate in the chuck base. Rigidly mounted on the upper end of the stem is a plate 128 for supporting an article of ware 7. This plate has radially projecting portions spaced 120° apart, and each is provided with a downwardly tapered opening forming a seat for a ball 129 held in place by a retaining ring 130. Each ball is provided with a central vertical passage in which a headed centering pin 132 is slidably mounted. Below the ball the pin is reduced in diameter to form a shoulder 133. Pressed upwardly against this shoulder by means of a coil spring 134 is the bifurcated outer end of an arm 135 disposed radially of the plate. Near its inner end the arm is provided with a pair of upwardly projecting lugs 137 that straddle a lug 138 projecting downwardly from the bottom of the plate. A pivot pin 139 extends through these three lugs. The plate 128 is urged upwardly away from the chuck base by means of a coil spring 141 encircling stem 127 and compressed between the plate and the inner ends of arms 135. While the plate is in its upper position, spring 141 will hold the inner ends of the arms down on the central portion of the base and thereby cause their outer ends to slide pins 132 upwardly in the balls to the dotted line position shown in Fig. 12.

An article of ware can be placed on the plate by inserting the edge of the ware under the head 142 of a centering pin and pushing it sideways to swing the pin away from the other two so that the edge of the plate can move down past them. When the ware is seated on the plate and pressed down, the engagement of the inner ends of arms 135 with the central portion of the chuck base will swing the outer ends of the arms down in order to pull the centering pins down in the balls until the heads of the pins overlap and engage the edge of the ware. Any further downward movement of the arms will be taken up by the springs 134 on the pins. When the pins are pulled down into ware-holding position, they assume vertical positions and thereby move the ware into centered position on the plate.

Plate 128 is held in its lower position by means of a spring catch 143 attached to the upper wall of the recess 144 in the bottom of the base. The lower end of this catch snaps over a shoulder 146 on a nut 147 adjustably mounted on a screw 148 projecting from the lower end of stem 127. When it is desired to remove the ware from the plate, the lower end of the spring catch is sprung out of engagement with the shoulder by pressing upwardly on a knob 149 mounted on the outer end of a pin 150 secured to the catch. The coil spring 141 then will lift the plate and ware, and arms 135 will lift the centering pins in the balls. The ware can be removed from the chuck by moving the ware sideways against one of the pins to free its opposite edge from the heads of the other two pins. The ware then can be lifted from between the three pins.

According to the provisions of the patent statutes, the principle, construction and mode of operation of the invention is explained and what is considered to be the best embodiment of the invention is illustrated and described. However, it is desired to have it understood that, within the scope of the appended claims, the invention may be practiced otherwise than as specifically illustrated and described.

What is claimed is:

1. In the multicolor decorating of dinnerware, an individual ware carrier, a movable support for supporting the carrier and moving it laterally from one decorating station to another, retaining means for centering an article of ware on the carrier and holding it in fixed position thereon throughout the decorating operation, lifting members for elevating said carrier from said support at each of said stations, decorators for decorating the elevated ware at each station, and interengaging positioners mounted on said members and carrier for rotating the elevated carrier on a vertical axis to a predetermined position at each station, whereby to produce registration of the decorations applied to the ware at said stations.

2. In the multicolor decorating of dinnerware, an individual ware carrier, a movable support for periodically supporting the carrier and moving it laterally from one decorating station to another, a decorating stamp disposed above the carrier at each decorating station, retaining means supported by the carrier for holding an article of ware in predetermined fixed position thereon throughout the decorating operation, elevating members independent of said support for lifting the carrier from the support at each of said stations to press the ware thereon against the stamp above it, and laterally projecting members on said elevating members and carrier and provided with engageable surfaces for rotating the carrier on a vertical axis to a predetermined position while it is being lifted, whereby to produce registration of the decorations stamped on the ware at said stations.

3. Apparatus for decorating dinnerware with a plurality of colors, comprising a conveyor provided with a vertical opening through it and moving in only one general direction from one decorating station to another, a decorating stamp disposed above said conveyor opening at each of said stations, a ware carrier normally seated in said conveyor opening, retaining means supported by said carrier adapted to hold an article of ware in predetermined fixed position thereon throughout the decorating operation, and a vertically movable lifting member normally below the conveyor opening at each station and adapted to be raised through said opening to lift the carrier from the conveyor in order to press the ware thereon against the stamp above it, said lifting member being provided with means for rotating the carrier on a vertical axis for adjusting the carrier to a predetermined position and holding it there while it is being lifted, whereby to produce registration of the decorations stamped on the ware at said stations.

4. In the multicolor decorating of dinnerware, an individual ware carrier, a movable support for supporting the carrier and moving it laterally from one station to another, lifting members for elevating said carrier from said support at each of said stations, a centering device above one station for centering an article of ware on the carrier when the carrier is elevated at that station, retaining means supported by the carrier for holding the centered ware in fixed position thereon, decorators for applying decoration to the elevated ware at succeeding stations, and interengaging positioners mounted on said members and carrier for rotating the elevated carrier on a vertical axis to a predetermined position at each decorating station, whereby to produce registration of the decorations applied to the ware at said decorating stations.

5. In dinnerware decorating apparatus, an independent ware carrier, ware-engaging retaining means supported by the carrier for holding an article of ware in predetermined fixed position thereon, a vertically reciprocable member, means for moving the carrier into a position above said member, means for raising said member to engage the carrier above it and lift the carrier, a decorator for decorating the ware on the elevated carrier, and said member and carrier being provided with an off-center projection and recess that register only in a single predetermined position.

6. In dinnerware decorating apparatus, a chuck base, a vertically movable support above said base adapted to slidably support an article of ware so that the ware can be adjusted laterally into predetermined position on said support, means urging said support upwardly away from the base, said support being adapted to be depressed by downward pressure on ware placed thereon, retaining means for holding ware in said predetermined position on the depressed support, a vertically reciprocable member adapted to engage said base and lift it, and said member and base being provided with interengaging means for rotating the base into a predetermined position on said member as said member rises into engagement with the base.

7. In dinnerware decorating apparatus, a chuck base, a vertically movable support above said base adapted to slidably support an article of ware, centering means disposed above said support and base and independent of them adapted to move ware on said support laterally into predetermined position thereon, resilient means urging said support upwardly away from the base, said support being adapted to be depressed by downward pressure on ware placed on it, retaining means connected to the base for holding said support depressed and the ware in said predetermined position thereon, a vertically reciprocable member adapted to engage said base and lift it, and said member and base being provided with interengaging means for rotating the base into a predetermined position on said member as said member rises into engagement with the base.

8. In dinnerware decorating apparatus, a chuck base, a vertically movable support above said base adapted to slidably support an article of ware, resilient means urging said support upwardly away from the base, a circular horizontal ring flaring downwardly, a holder for said ring above said ware support, mechanism for effecting relative vertical movement between said base and ring whereby the ring will center ware on said support and press the ware and support downwardly relative to the base, retaining means connected to the base for holding the support depressed and the ware centered thereon, a vertically reciprocable member adapted to engage said base and lift it, and said member and base being provided with interengaging means for rotating the base into a predetermined position on said member as said member rises into engagement with the base.

9. In the multicolor decoration of dinnerware, a horizontal chuck, retaining means supported by the chuck for holding an article of ware in predetermined fixed position thereon throughout the decorating operation, a plurality of chuck supports for receiving the chuck in succession, a ware decorating stamp disposed above each support, and interengaging means mounted on the chuck and each support and provided with cam surfaces that engage and force the chuck to rotate on its axis into a predetermined position on the underlying support as it is received by that support.

10. In the multicolor decorating of dinnerware, an individual ware carrier, a movable support for supporting the carrier and moving it laterally from one decorating station to another, a decorating stamp disposed above the carrier at each decorating station, retaining means supported by the carrier for holding an article of ware in predetermined fixed position thereon throughout the decorating operation, lifting members for lifting the carrier from said support at each of said stations to press the ware thereon against the stamp above it, and said lifting members and carrier being provided with interengaging means provided with cam surfaces that engage when a lifting member moves up into engagement with the carrier and force the carrier to rotate on a vertical axis into predetermined position on said member, whereby to produce registration of the decorations stamped on the ware at said stations.

ELIZABETH KING EMERSON,
*Executrix of the Estate of Walter H. Emerson, Deceased.*

REFERENCES CITED

The following references are of record in the file of this patent:

UNITED STATES PATENTS

| Number | Name | Date |
|---|---|---|
| 881,288 | Barrett | Mar. 10, 1908 |
| 1,279,904 | Putnam et al. | Sept. 24, 1918 |
| 1,294,012 | Winter | Feb. 11, 1919 |
| 1,682,040 | Hardie | Aug. 28, 1928 |
| 1,915,646 | Christman | June 27, 1933 |
| 2,196,094 | Bennett et al. | Apr. 2, 1940 |
| 2,203,572 | Johnson | June 4, 1940 |
| 2,335,213 | Lawrence | Nov. 23, 1943 |
| 2,372,089 | Keller | Mar. 20, 1945 |
| 2,380,509 | Emerson | July 31, 1945 |
| 2,426,391 | Emerson | Aug. 26, 1945 |
| 2,437,224 | Emerson | Mar. 2, 1948 |
| 2,493,953 | Emerson | Jan. 10, 1950 |